United States Patent [19]

Ohuchi

[11] Patent Number: 5,038,241
[45] Date of Patent: Aug. 6, 1991

[54] MAGNETIC RECORDING/PLAYBACK APPARATUS HAVING MAGNETIC HEAD ASSEMBLY ADAPTED TO BE REPLACED BY USERS

[75] Inventor: Hideo Ohuchi, Zama, Japan

[73] Assignee: Kabushiki Kaisha Toshiba, Kawasaki, Japan

[21] Appl. No.: 439,102

[22] Filed: Nov. 20, 1989

[30] Foreign Application Priority Data

Nov. 29, 1988 [JP] Japan .................. 63-299464

[51] Int. Cl.⁵ .................. G11B 21/26; G11B 21/24
[52] U.S. Cl. ...................... 360/109; 360/107
[58] Field of Search .............. 360/109, 107, 130.22, 360/130.23, 130.24, 84, 85, 95

[56] References Cited

U.S. PATENT DOCUMENTS

| | | | |
|---|---|---|---|
| 4,081,847 | 3/1978 | Shimada et al. | 360/107 |
| 4,099,211 | 7/1978 | Hathaway | 360/109 |
| 4,151,569 | 4/1979 | Hathaway | 360/109 |
| 4,151,570 | 4/1979 | Ravizza et al. | 360/109 |
| 4,184,183 | 1/1980 | Dolby | 360/107 |
| 4,647,999 | 3/1987 | Mlinaric et al. | 360/109 |

Primary Examiner—John H. Wolff
Assistant Examiner—Craig A. Renner
Attorney, Agent, or Firm—Oblon, Spivak, McClelland, Maier & Neustadt

[57] ABSTRACT

A rotating drum of a magnetic recording/playback apparatus is fitted with a rail which extends in the radial direction of the drum. A head assembly has magnetic heads, grooves engaging the rail, and a stopper adapted to engage the rail. In this arrangement, each magnetic head is automatically located in a predetermined position when the head assembly is set in place on the rotating drum after the head assembly, moved in the radial direction of the drum so that the grooves are guided by the rail, is prevented from moving by the stopper. In this manner, the magnetic heads can be accurately positioned with ease. Thus, even a user can easily replace the head assembly.

7 Claims, 10 Drawing Sheets

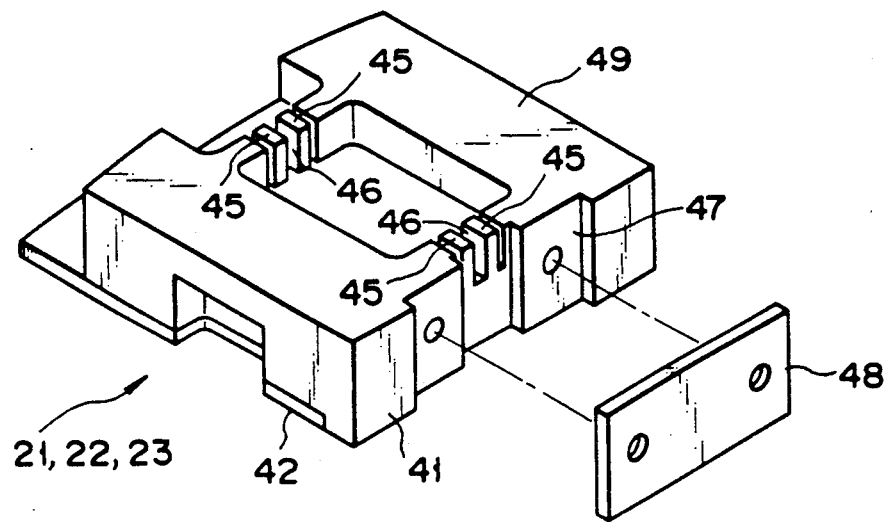
F I G. 5
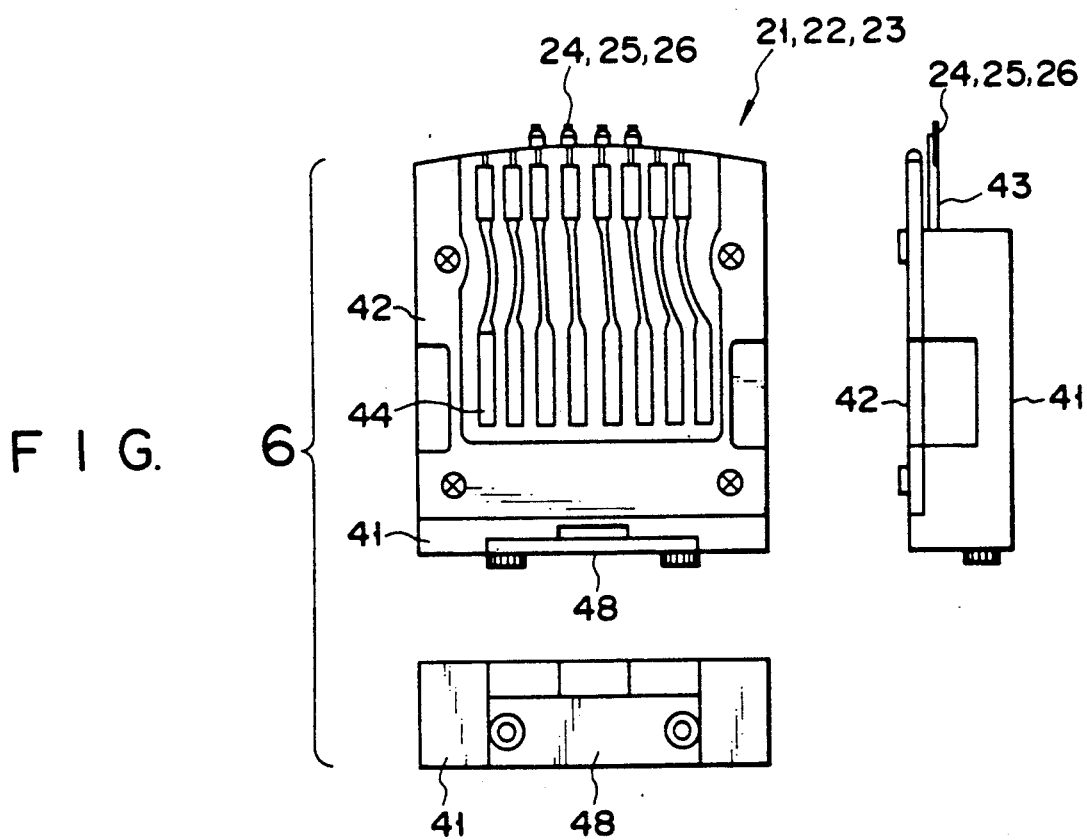
F I G. 6

MAGNETIC RECORDING/PLAYBACK APPARATUS HAVING MAGNETIC HEAD ASSEMBLY ADAPTED TO BE REPLACED BY USERS

BACKGROUND OF THE INVENTION

1. Field of the Invention

The present invention relates to a magnetic recording/playback apparatus, and more particularly to a magnetic recording/playback apparatus having a magnetic head assembly adapted to be replaced by users.

2. Description of the Related Art

In a magnetic recording/playback apparatus, e.g., VTR, a plurality of magnetic head assemblies are arranged at regular intervals along the circumference of a rotating drum. Each head assembly includes a plurality of magnetic heads, e.g., recording heads, playback heads, and an erase head, which are each projected for a predetermined distance from the outer peripheral surface of the rotating drum, in the radial direction thereof. A magnetic tape, being transported so as to be wound around the outer peripheral surface of the rotating drum, is pressed against the magnetic heads, so that magnetic recording information is recorded on or read from the tape.

The magnetic heads are usually exhausted in about 500 hours, and may possibly be damaged during use. It is to be desired, in such a case, that users should be able to remove the rotating drum itself from the VTR, and replace the head assemblies on the spot, instead of having them replaced in a manufacturer's service station.

It is necessary, however, to maintain predetermined intervals between a plurality of magnetic heads, a predetermined length of projection of each magnetic head from the outer peripheral surface of the rotating drum, and a predetermined direction of projection of each magnetic head. That is, it is necessary that magnetic heads can be accurately positioned. If one head assembly includes only one magnetic head, the magnetic recording/playback performance can hardly be lowered even though the magnetic head is not located in a predetermined position. However, if one head assembly includes a plurality of magnetic heads (e.g., four in number), as in the case of a modern high-density recording/playback apparatus, such as a high-grade VTR using a one-inch tape, the magnetic recording/playback performance is considerably lowered unless the magnetic head is properly positioned.

Accordingly, each head assembly is mounted on the rotating drum by means of a position adjusting apparatus constructed as follows. Two pressure-contact spheres attached to the head assembly are pressed against a reference surface on the rotating drum. Also, an adjust screw attached to the head assembly is pressed against the rotating drum. The length of projection of each magnetic head can be adjusted by rotating the adjust screw. In other words, the head assembly is supported on the rotating drum at three supporting points.

It is difficult, however, to position the magnetic heads accurately by means of the position adjusting apparatus. For example, a gap may be formed between one of the pressure-contact spheres and the reference surface, so that the magnetic heads sometimes may fail to be properly positioned when the head assemblies are mounted on the rotating drum.

Thus, the replacement of the head assemblies requires a relatively complicated adjustment work. Therefore, it is hardly possible for those users who are inexperienced in such adjustment to replace the head assemblies. In such a case, the head assemblies are replaced in the manufacturer's service station or by a serviceman skilled in adjusting the magnetic heads.

SUMMARY OF THE INVENTION

The object of the present invention is to provide a magnetic recording/playback apparatus, in which magnetic heads can be accurately positioned with ease when a head assembly is mounted on a rotating drum, so that even a user can easily replace the head assembly.

According to the present invention, there is provided a magnetic recording/playback apparatus, which comprises: a rotating drum having an outer peripheral surface; a magnetic head assembly disposed inside the outer peripheral surface of the rotating drum, the head assembly including a magnetic head to be located projecting for a predetermined distance from the outer peripheral surface of the rotating drum, substantially in the radial direction of the rotating drum; means for guiding the head assembly substantially in the radial direction of the rotating drum; and means for preventing the head assembly from moving in the radial direction when the head assembly, guided by the guide means, is moved so that the magnetic head projects for the predetermined distance from the outer peripheral surface of the rotating drum.

Thus, according to the present invention, the position of the magnetic head need not be adjusted. More specifically, the magnetic head is automatically located in a predetermined position when the head assembly is set in place on the rotating drum after the head assembly, moved in the radial direction of the drum, is prevented from moving by the movement preventing means. In this manner, the magnetic head can be accurately positioned with ease. Even if the replacement of the head assembly is frequently repeated, moreover, the magnetic head can always be accurately positioned. Thus, positioning the magnetic head is highly reliable, and even a user can easily replace the head assembly.

BRIEF DESCRIPTION OF THE DRAWINGS

FIG. 5 is an exploded perspective bottom view of the head assembly;

FIG. 6 is a combination of a plan view, a rear view, and a side view of the head assembly;

DETAILED DESCRIPTION OF THE PREFERRED EMBODIMENTS

Figure 1:
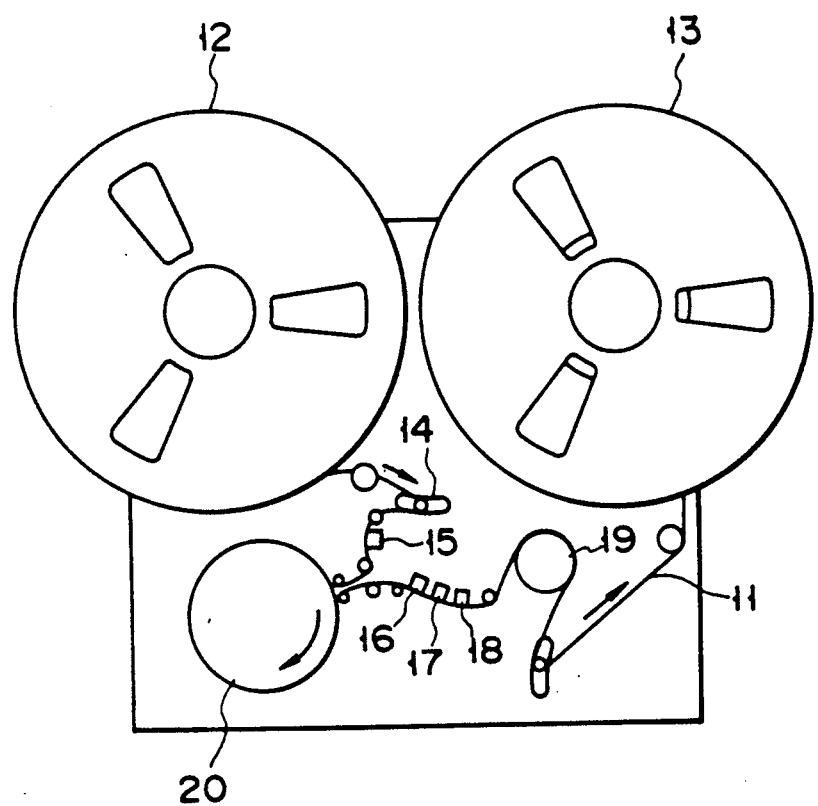
FIG. 1 is a plan view of a VTR.

FIG. 1 shows a high-grade VTR which uses a one-inch tape. This VTR is provided with supply reel 12 for feeding tape 11 and take-up reel 13 for taking up the tape. Arranged on a tape transfer path between reels 12 and 13 are tension arm 14, erase head 15, rotating drum (or head drum) 20 having magnetic heads for recording, reproducing, or erasing video information, erase head 16 for audio information, recording/playback head 17 for audio information, monitor head 18, and single vacuum capstan 19 for running the tape at a proper speed.

Figure 2:
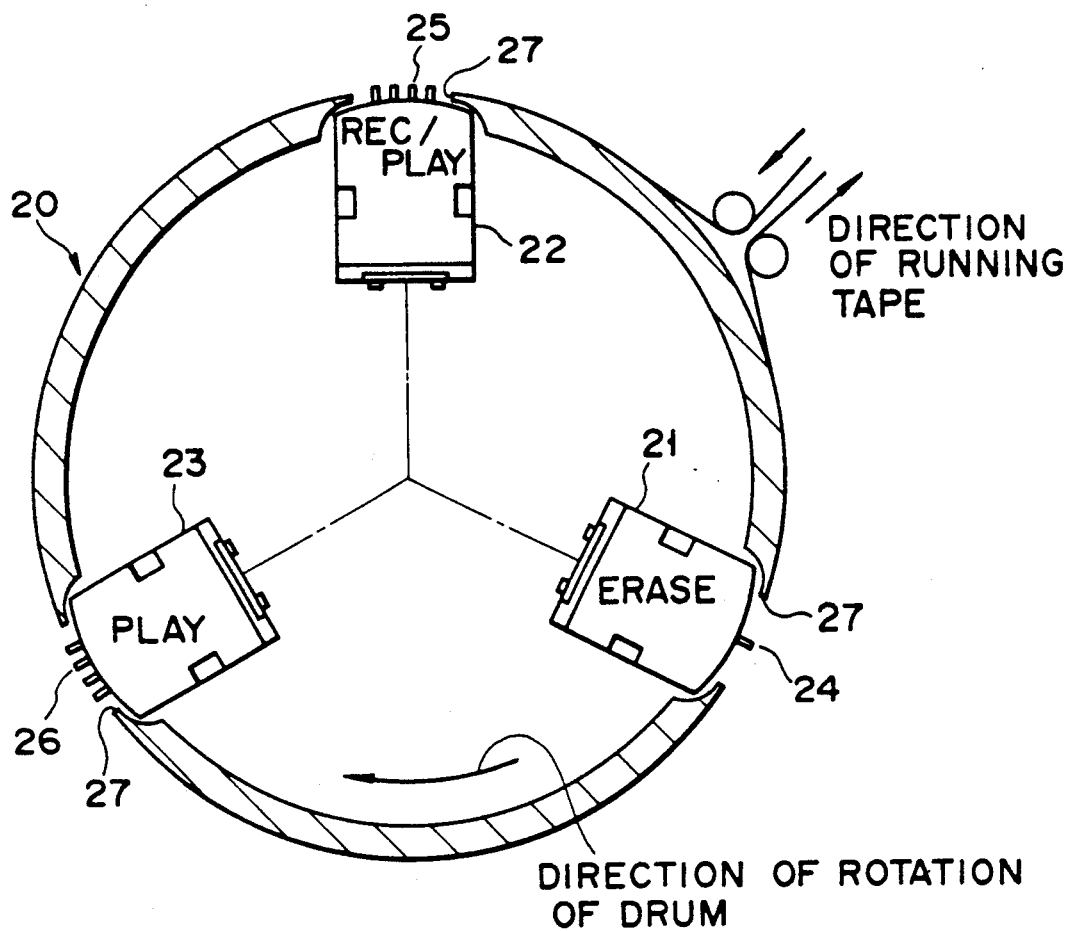
FIG. 2 is a horizontal sectional view of a rotating drum.

FIG. 2 is an enlarged view of rotating drum 20. Tape 11 is wound around the outer peripheral surface of drum 20. The rotating direction of drum 20 is opposite to the running direction of tape 11. Three head assemblies 21, 22 and 23 are arranged at regular intervals along the circumference of drum 20. Assemblies 21, 22 and 23 include one erase magnetic head 24, four magnetic recording/playback heads 25, and four magnetic playback heads 26, respectively. Each magnetic head is projected for a predetermined distance from each corresponding window 27 of rotating drum 20, in a predetermined direction, and is pressed against tape 11. Thus, when drum 20 is rotated to run tape 11, the magnetic heads record, reproduce, or erase the video information.

Erase head 24 simultaneously erases information for four tracks, while four recording/playback heads 25 and four playback heads 26 record or reproduce information in parallel relation in a transmission band (four-channel) of 40 MHz. This is because the four-channel transmission band of 40 MHz is established for a one-inch VTR, and a transmission band (one-channel) of 10 MHz is assigned to each magnetic head.

Figure 3:
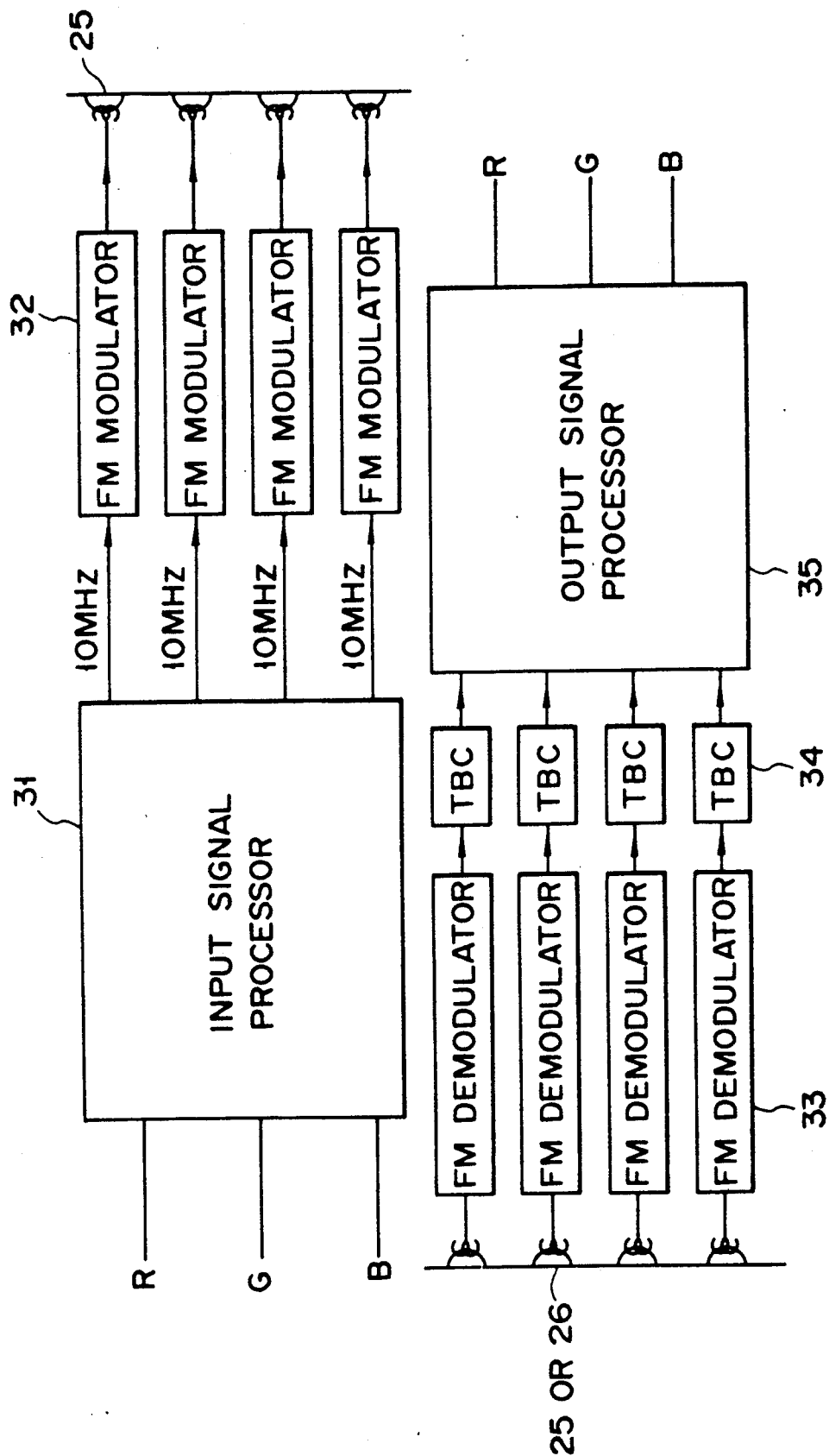
FIG. 3 is a block diagram showing video signals.

FIG. 3 is a block diagram showing video signals. Input signals R, G, and B are converted into signals of four channels by input signal processor 31. Thereafter, the signals of the individual channels are FM-modulated by FM modulators 32, and are recorded on the tape by recording heads 25. The signals read by playback heads 25 are processed by FM demodulators 33, TBCs (time base correctors) 34, and output signal processor 35, to be restored to video signals R, G, and B.

The following is a description of the head assemblies which can be replaced by users, thus constituting a characteristic feature of the present invention.

FIGS. 4 to 8 show head assemblies 21, 22 and 23. Each head assembly includes head base 41. Substrate 42 is fixed to the upper surface of head base 41 by means of screws. Retaining members 43 extend from one side of head base 41, and magnetic heads 24, 25 and 26 are attached individually to the distal ends of members 43. Wire 44 formed on the upper surface of substrate 42 is connected to each magnetic head.

In the present invention, as is best seen from FIG. 5, two pairs of ridges 45 are formed on the bottom surface of head base 41, and guide groove 46 is defined between each pair of ridges 45. Grooves 46 engage rail 52 (not shown) of rotating drum 20, and guide the head assembly in the radial direction of the drum.

Recess 47 is formed on the other side of head base 41. Stopper 48, which is adapted to engage rail 52 to prevent the head assembly from moving in the radial direction, is fixed to recess 47 by means of screws.

Lower surface 49 of head base 41, which serves as a reference surface to be brought into contact with rotating drum 20, is smoothed with high accuracy.

Figure 4:
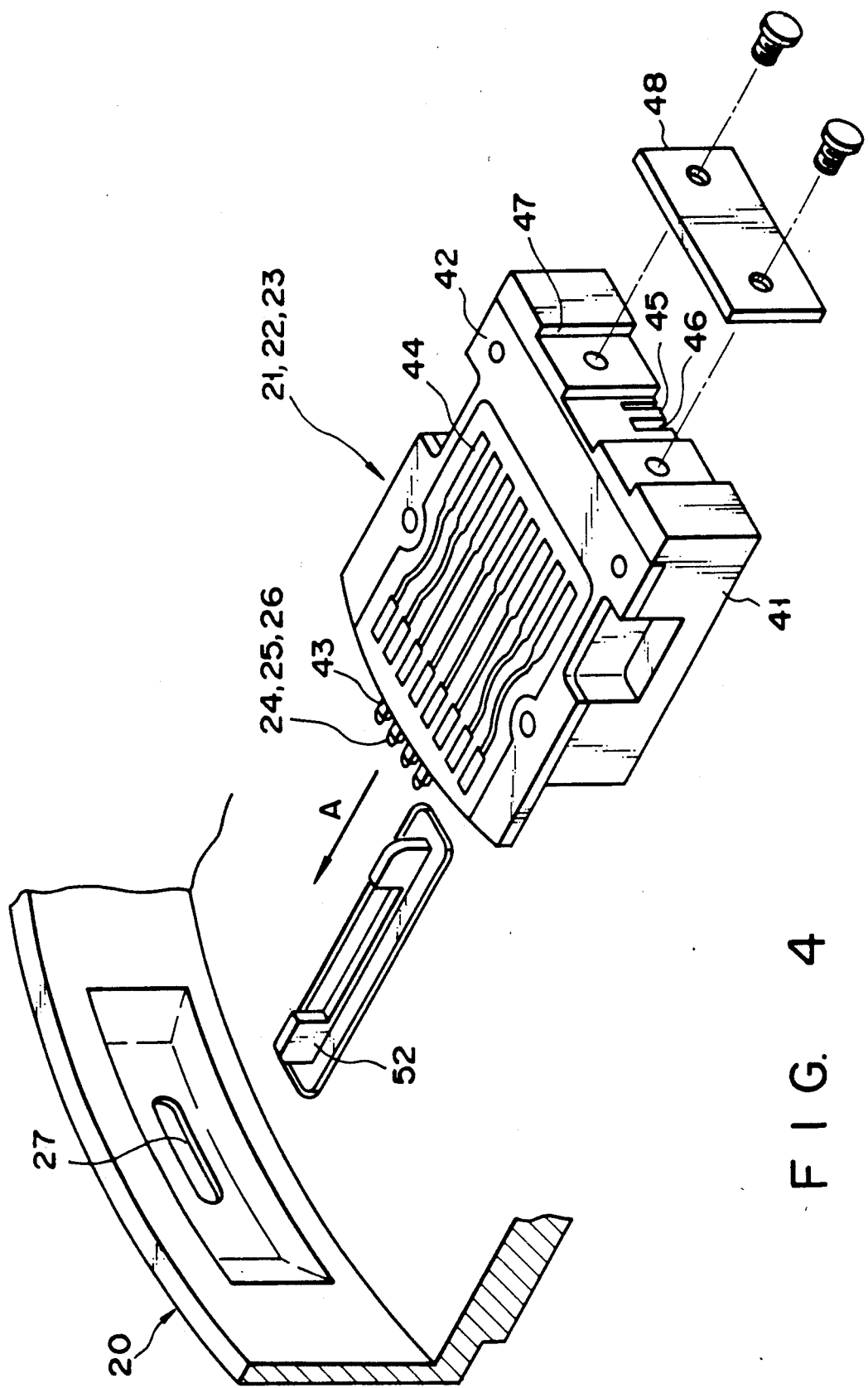
FIG. 4 is a combination of a partial perspective view of the rotating drum and an exploded perspective view of a head assembly.
Figure 7:
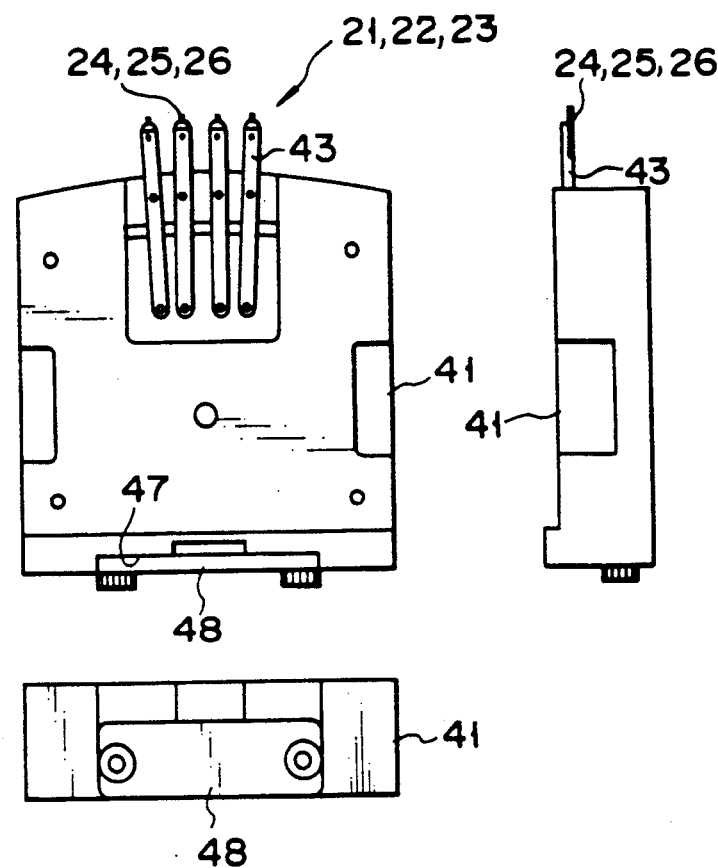
FIG. 7 is a combination of a plan view, a rear view, and a side view of the head assembly without a substrate thereon.
Figure 8:
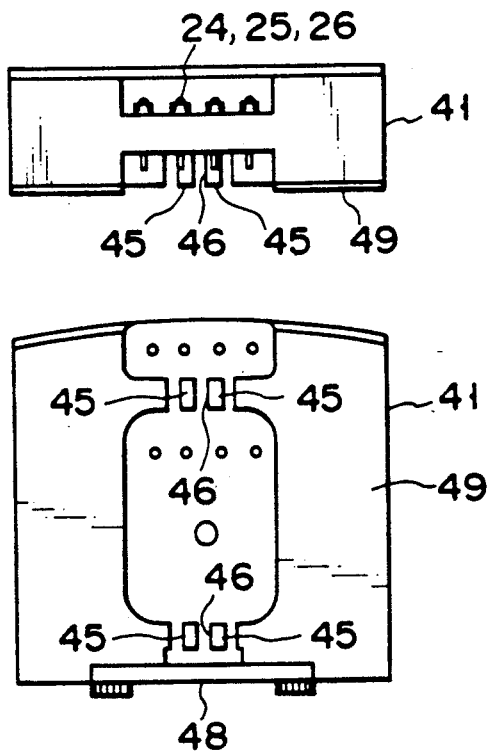
FIG. 8 is a combination of a front view and a bottom view of the head assembly.
Figure 9:
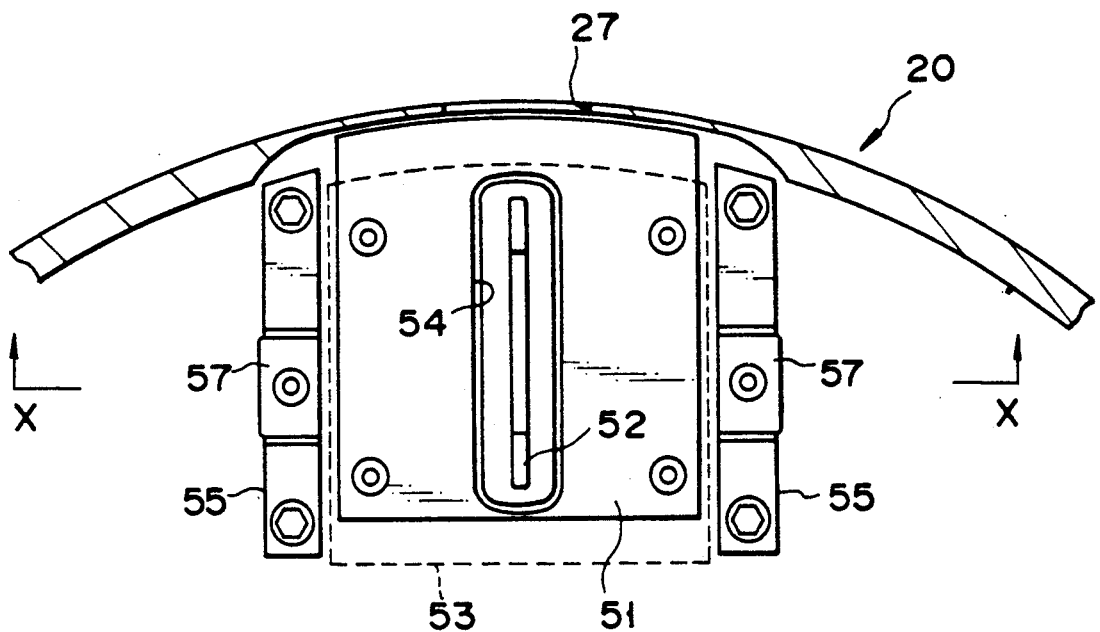
FIG. 9 is a horizontal sectional view of the rotating drum without the head assembly thereon.
Figure 10:
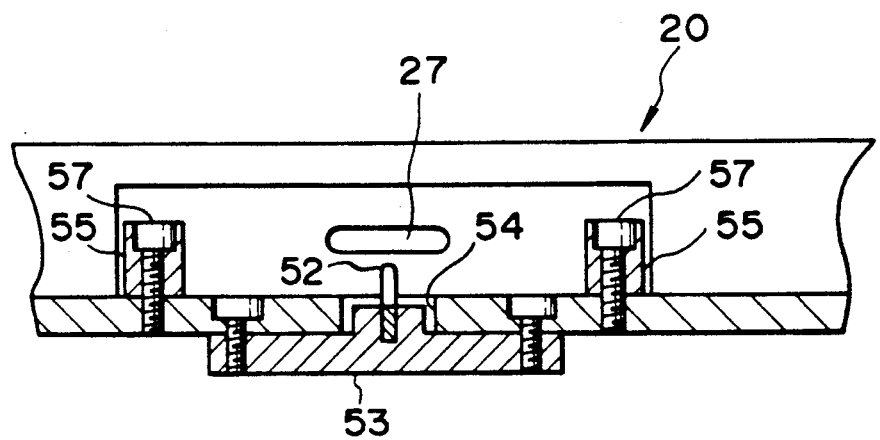
FIG. 10 is a sectional view taken along line X—X of FIG. 9.

Referring now to FIGS. 4, 9 and 10, the construction of rotating drum 20 mounted with the head assemblies will be described.

Reference surface 51 of rotating drum 20 is fitted with rail 52 which, extending in the radial direction of drum 20, is adapted to be fitted in grooves 46 of the head assembly. Retaining member 53 is fixed to the underside of surface 51 by means of screws. Reference surface 51 is formed with opening 54, through which rail 52 attached to retaining member 53 projects above surface 51.

Guide members 55 for guiding the head assembly in the radial direction of rotating drum 20 are arranged on either side of reference surface 51. Each guide member 55 is fitted with clamp 56 (shown in FIG. 11) for fixing the head assembly to drum 20, thus constituting pedestal 57.

The width of each groove 46 of the head assembly is made a little smaller (e.g., by 20 μm) than the thickness of rail 52. Thus, ridges 45, which define grooves 46, elastically press rail 52, so that there is no play between grooves 46 and rail 52.

In the present invention, rail 52 and grooves 46 constitute means for guiding the head assembly in the radial direction. Stopper 48 constitutes means for preventing the head assembly from moving when each magnetic head reaches a predetermined position. The direction of projection of each magnetic head is determined by the extending direction of rail 52, and the length of its projection is determined by the position of engagement between rail 52 and stopper 48. Accordingly, rail 52, grooves 46, and stopper 48 must be formed with high accuracy, as mentioned later.

Figure 11:
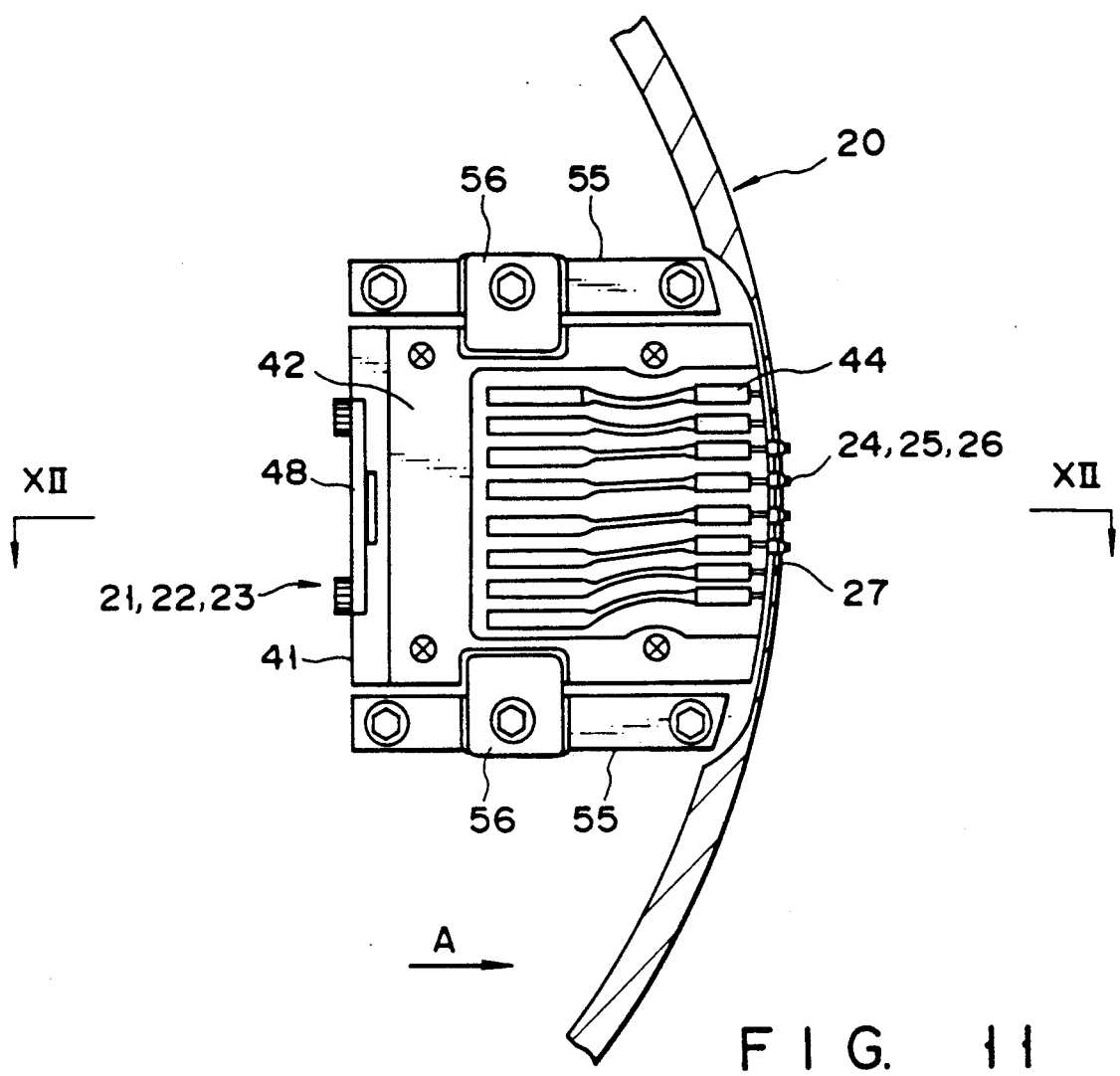
FIG. 11 is a horizontal sectional view of the rotating drum with the head assembly thereon.
Figure 12:
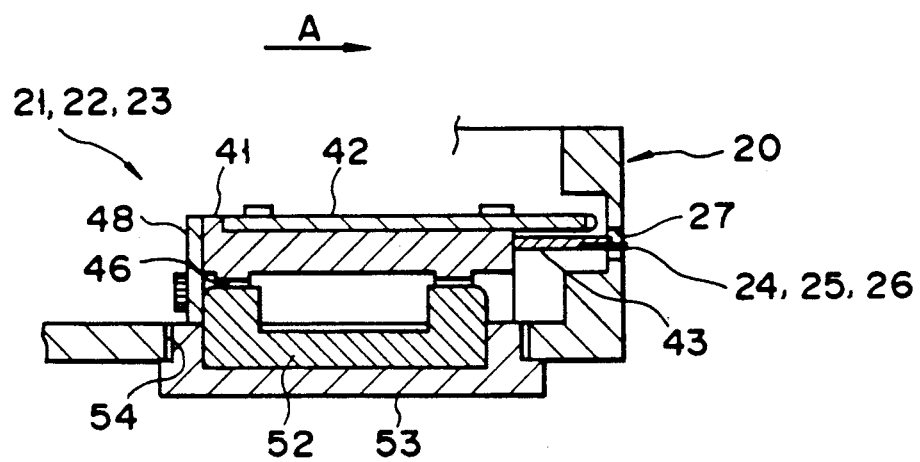
FIG. 12 is a sectional view taken along line XII—XII of FIG. 11.

Referring now to FIGS. 4, 11 and 12, operation for mounting each head assembly on rotating drum 20 will be described.

Holding the head assembly with his or her fingers, an operator (e.g., user) puts it on rail 52 so that the rail is fitted in grooves 46 of the head assembly. The head assembly is pressed downward so that its reference surface 49 is in contact with reference surface 51 of rotating drum 20. Thereafter, the head assembly is moved in the radial direction (direction of arrow A of FIGS. 4, 11 and 12) of drum 20 so that grooves 46 slidingly engage rail 52. When the magnetic head reaches the predetermined position, one end of rail 52 abuts against stopper 48, so that the radial movement of the head assembly is prevented. At this t[me, the head assembly is attached relatively firmly to rotating drum 20 by means of the elasticity of ridges 45. Thereafter, clamps 56 are screwed to their corresponding pedestals 57 so that the head assembly is fixed fully to the rotating drum.

Figure 13:
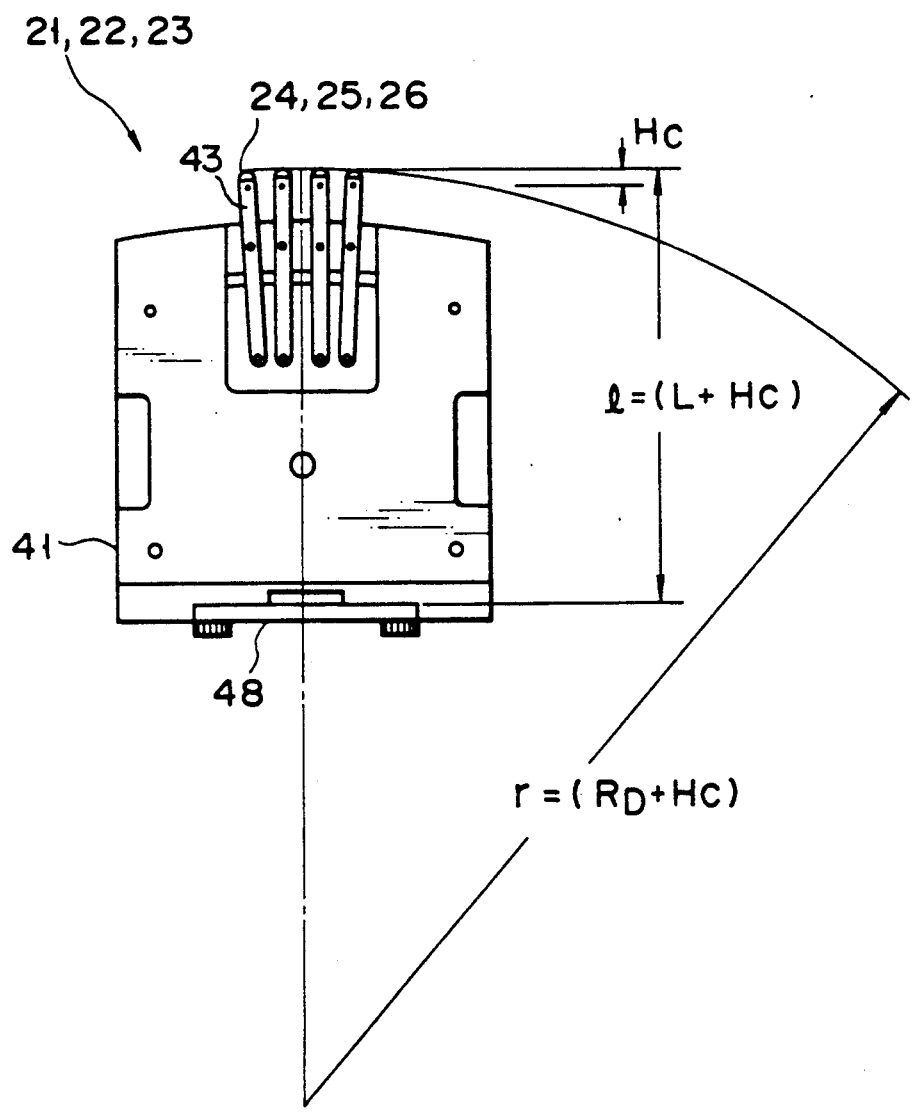
FIG. 13 is a plan view of the head assembly, illustrating the dimensional relationships between the rotating drum and the head assembly without the substrate thereon.

Referring now to FIG. 13, the dimensional relationships between each head assembly and the rotating drum will be described.

If the radius of the outer peripheral surface of the rotating drum and the length of projection of magnetic heads 24, 25 and 26 are $R_D$ and $H_C$, respectively, the tip end of each magnetic head is situated on a circle with a radius $r=(R_D+H_C)$. If the distance from stopper 48 to the outer peripheral surface of the drum is L, moreover, the distance l from stopper 48 to imaginary tip end located on the radius r formed by the magnetic head is $l=(L+H_C)$. Only the horizontal positions of the individual magnetic heads must be aligned with recording formats, so that only the horizontal arrangement of the magnetic heads will be described herein. In other words, a description of the vertical arrangement of the magnetic heads is omitted.

Figure 14:
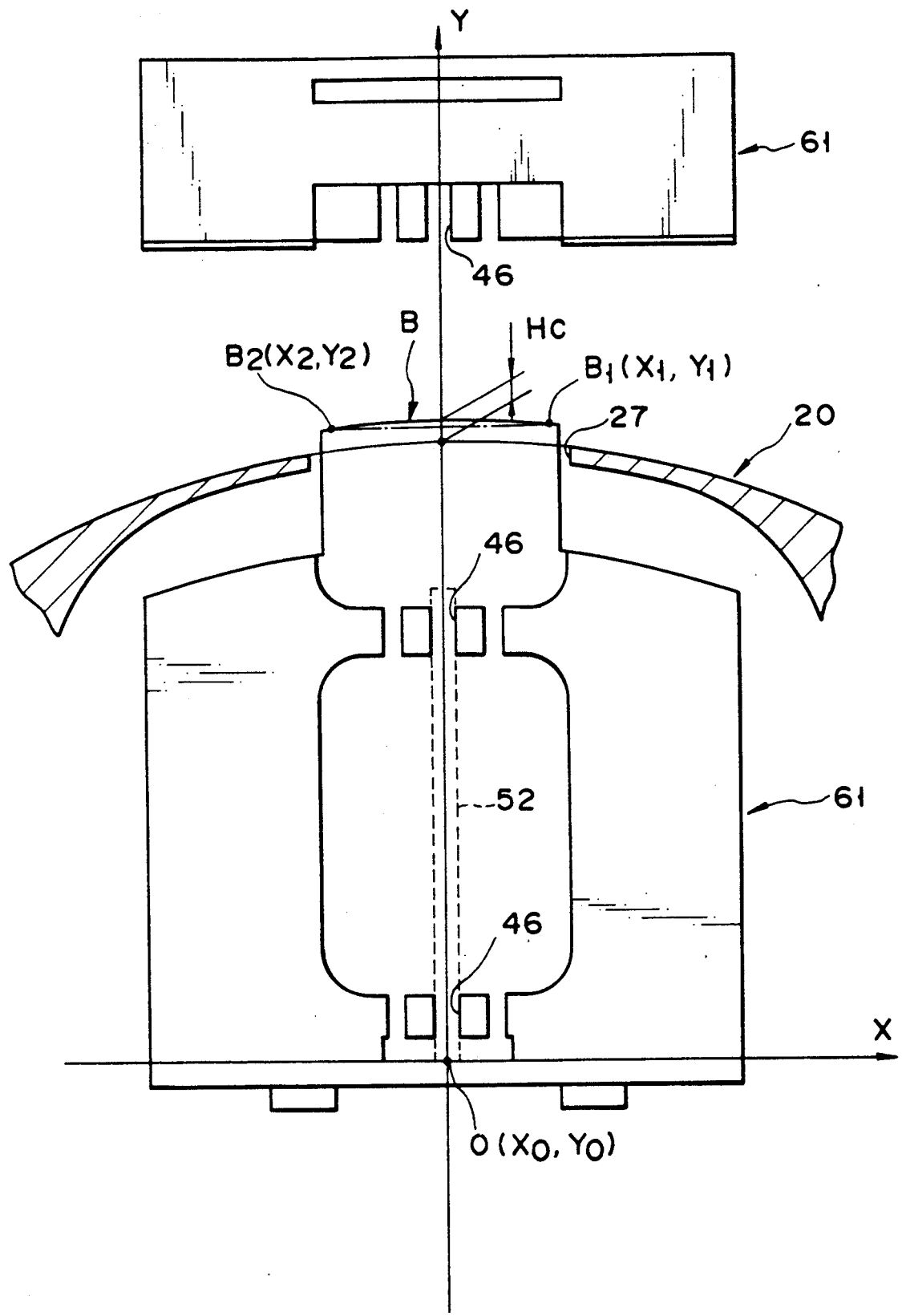
FIG. 14 is a combination of a bottom view and a front view of a head master gage, illustrating the way a rail is mounted on the rotating drum.

In the present invention, rail 52 and each magnetic head must be mounted on rotating drum 20 and the head assembly, respectively, so that these dimensional relationships can be maintained with high accuracy. As shown in FIG. 14, therefore, rail 52 is positioned by means of head master gage 61 before it is mounted on the rotating drum.

Head master gage 61 is shaped just like each head assembly. Symbol B designates a circular arc which passes through the respective tip ends of the magnetic heads. In an X-Y coordinate system shown in FIG. 14, the X-axis passes through the position of engagement between rail 52 and stopper 48, while the Y-axis passes through the center line of groove 46. Points B1 (X1, Y1) and B2 (X2, Y2) are taken on circular arc B, and origin 0 (X0, Y0) is also taken.

The respective values of Y1 and Y2 are determined on the basis of origin 0. The Y-direction position of rail 52 is adjusted so that Y1 and Y2 take their respective predetermined values. Thereupon, the position of rail 52 can be adjusted so that the length of projection of each magnetic head is at a predetermined value. Errors of the values of Y1 and Y2 are within the range of 2 to 3 $\mu m$.

Subsequently, rotating drum 20 is rotated while the values of Y1 and Y2 are being determined. The extending direction of rail 52 is adjusted so that the values of Y1 and Y2 are set to the predetermined values. Thereupon, the extending direction of the rail can be adjusted so that each magnetic head extends in a predetermined direction. Thus, positioning the rail is completed, and the rail is fixed to the rotating drum.

A rail jig having the same shape as rail 52 adjusted by master gage 61 is used in mounting the magnetic heads on each head assembly. Thus, each magnetic head can be highly accurately mounted on the head assembly.

In the present invention, the direction of projection of each magnetic head is determined by the extending direction of rail 52, and the length of its projection is determined by the position of engagement between rail 52 and stopper 48. Further, rail 52 and the magnetic heads are highly accurately mounted on the rotating drum and the head assembly, respectively.

Thus, each magnetic head is automatically located in a predetermined position when the head assembly is set in place on the rotating drum after the head assembly, moved in the radial direction of the drum so that grooves 46 are guided by rail 52, is prevented from moving by stopper 48. In this manner, the magnetic heads can be accurately positioned with ease. In other words, the length and direction of projection of each magnetic head can be accurately set with ease. Even if the replacement of the head assembly is frequently repeated, moreover, the magnetic heads can always be accurately positioned. Thus, positioning the magnetic head is highly reliable, and even a user can easily replace the head assembly.

Arranged on the top cover of the rotating drum are connectors (not shown) which are to be connected to wires 44 of the head assembly. A plurality of rails may alternatively be mounted on the rotating drum.

What is claimed is:

1. A magnetic recording/playback apparatus, comprising:
   a rotating drum having an outer peripheral surface;
   a magnetic head assembly disposed inside the outer peripheral surface of the rotating drum for movement to a predetermined position, said head assembly including a plurality of magnetic heads to be located so as to project from the outer peripheral surface of the rotating drum by a predetermined distance at the predetermined position, substantially in a radial direction of the rotating drum;
   guide means for guiding the head assembly substantially in the radial direction of the rotating drum, said guide means including a rail attached to the rotating drum and extending substantially in the radial direction of the rotating drum and a groove, formed on the head assembly, for slidingly engaging the rail to guide the head assembly in the radial direction of the rotating drum; and
   movement preventing means for preventing the head assembly from moving in the radial direction when the head assembly, guided by the guide means, is moved to the predetermined position so that the plurality of magnetic heads project from the outer peripheral surface of the rotating drum by the predetermined distance, the movement preventing means including a stopper, fixed to the head assembly and adapted to engage the rail to prevent movement of the head assembly in the radial direction at the predetermined position.

2. The magnetic recording/playback apparatus according to claim 1, wherein a width of said groove is a little smaller than the thickness of the rail, so that there is no play between the groove and the rail.

3. The magnetic recording/playback apparatus according to claim 1, wherein a length of projection of said head assembly is determined by the position of engagement between the rail and the stopper.

4. The magnetic recording/playback apparatus according to claim 1, wherein a direction of projection of said head assembly is determined by an extending direction of the rail.

5. A magnetic head assembly which is disposed inside an outer peripheral surface of a rotating drum of the magnetic recording/playback apparatus, comprising:
   said magnetic head assembly to be moved to a predetermined position and including a plurality of magnetic heads to be located so as to project from the outer peripheral surface of the rotating drum by a predetermined distance at the predetermined position, substantially in a radial direction of the rotating drum;
   a second engaging portion of the head assembly adapted to engage a first engaging portion of the rotating drum to be guided substantially in the radial direction of the rotating drum, wherein said second engaging portion is a groove for slidingly engaging the first engaging portion and wherein said first engaging portion is a rail extending substantially in the radial direction of the rotating drum; and
   movement preventing means for preventing the head assembly from moving in the radial direction when the head assembly, with the second engaging portion thereof guided by the first engaging portion, is moved to the predetermined position so that the plurality of magnetic heads project by the predetermined distance from the outer peripheral surface of the rotating drum, wherein said movement preventing means includes a stopper fixed to the head assembly and adapted to engage the rail, thereby preventing radial movement of the head assembly when the head assembly is moved to the predetermined position.

6. The magnetic head assembly according to claim 5, wherein a width of said groove is a little smaller than the thickness of the rail, so that there is no play between the groove and the rail.

7. A method for mounting a magnetic head assembly, having a plurality of magnetic heads, on a rotating drum of a magnetic recording/playback apparatus, so that said plurality of magnetic heads are positioned at a first position so as to project from an outer peripheral surface of said rotating drum by a predetermined distance, substantially in a radial direction thereof, comprising the steps of;

placing said head assembly at a second position of the rotating drum, which is located inward substantially in the radial direction from the first position, so that a second engaging portion in the form of a groove attached to the head assembly is adapted to engage a first engaging portion in the form of a rail attached to the rotating drum; and moving the head assembly substantially in the radial direction of the rotating drum while engaging the second engaging portion with the first engaging portion, so that when the plurality of magnetic heads reach the first position, the head assembly is prevented from moving substantially in the radial direction, thereby positioning the plurality of magnetic heads at the first position.

* * * * *